United States Patent Office 3,118,258
Patented Jan. 21, 1964

3,118,258
AUTOMATIC CRANKPIN GRINDER
Ralph E. Price and Harold E. Balsiger, Waynesboro, Pa., assignors to Landis Tool Company, Waynesboro, Pa.
Filed Mar. 3, 1961, Ser. No. 93,249
30 Claims. (Cl. 51—105)

The invention relates to grinding machines for grinding crankpins of automotive crankshafts.

Crankpin grinders of the type in which all the crankpins of a crankshaft are ground in one machine have never been fully automatic because the function of rotary indexing of the crank from one pin to another has been performed manually.

The apparatus for performing this function automatically is disclosed in U.S. Patent 2,651,895, granted September 15, 1953, now Reissue Patent 24,091. However, the patent does not disclose the automatic rotary indexing as part of a complete automatic machine.

It is, therefore, an object of the present invention to provide a machine for grinding all the pins on a crankshaft automatically.

Figure 1:
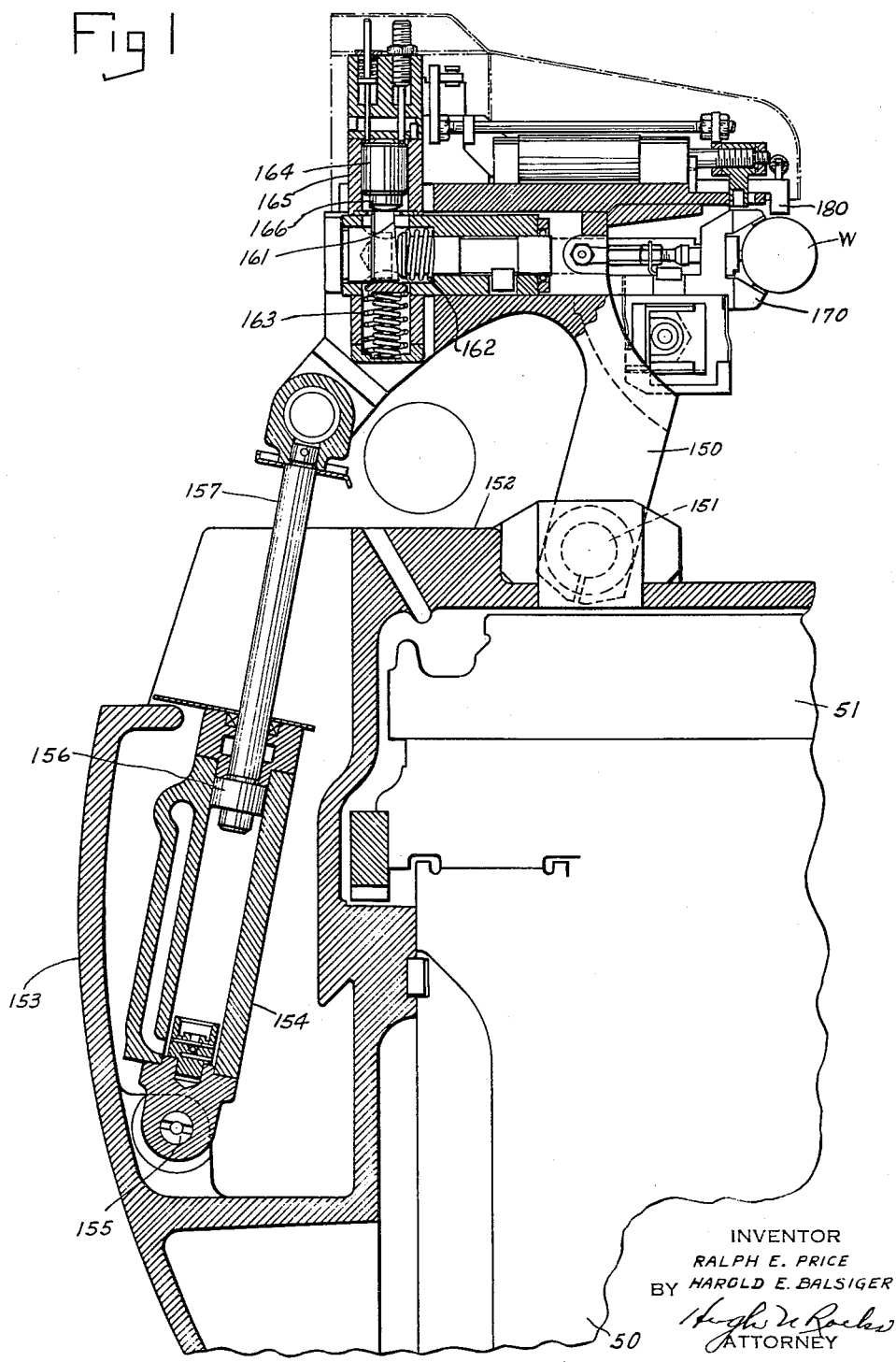
FIG. 1 is a partial sectional end elevation of the positioner.
Figure 2:
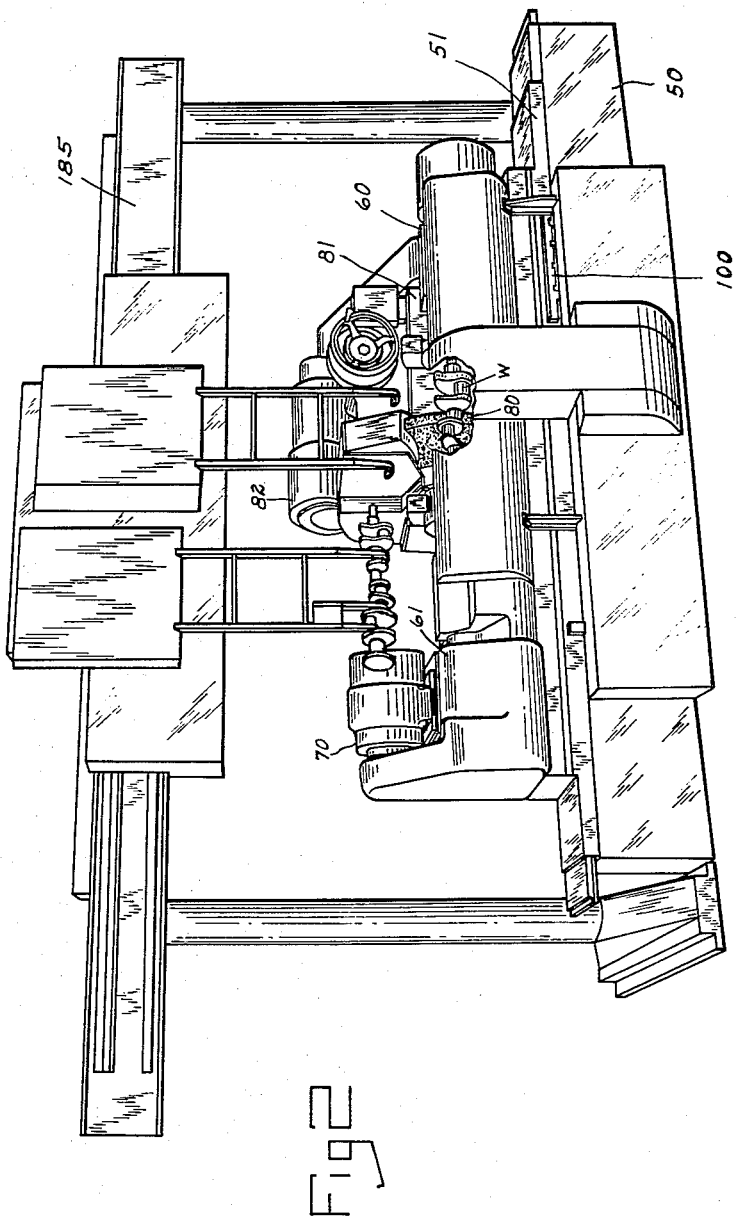
FIG. 2 is a perspective front elevation of an automatic crankpin grinder and a transfer apparatus for transferring workpieces from a pick-up point to the machine and from the machine to a discharge point.
Figure 3:
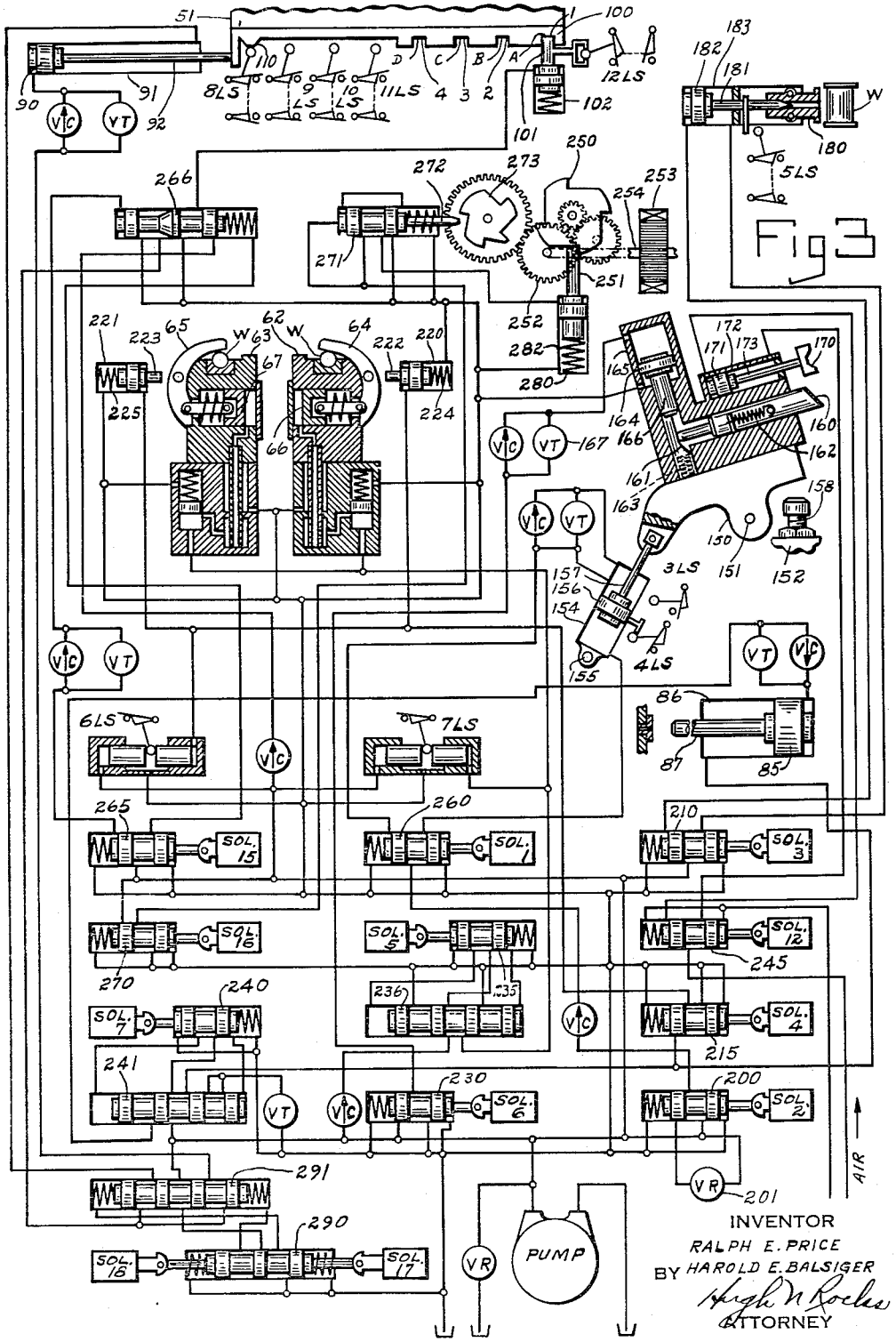
FIG. 3 is a diagram of the hydraulic circuit.
Figure 4:
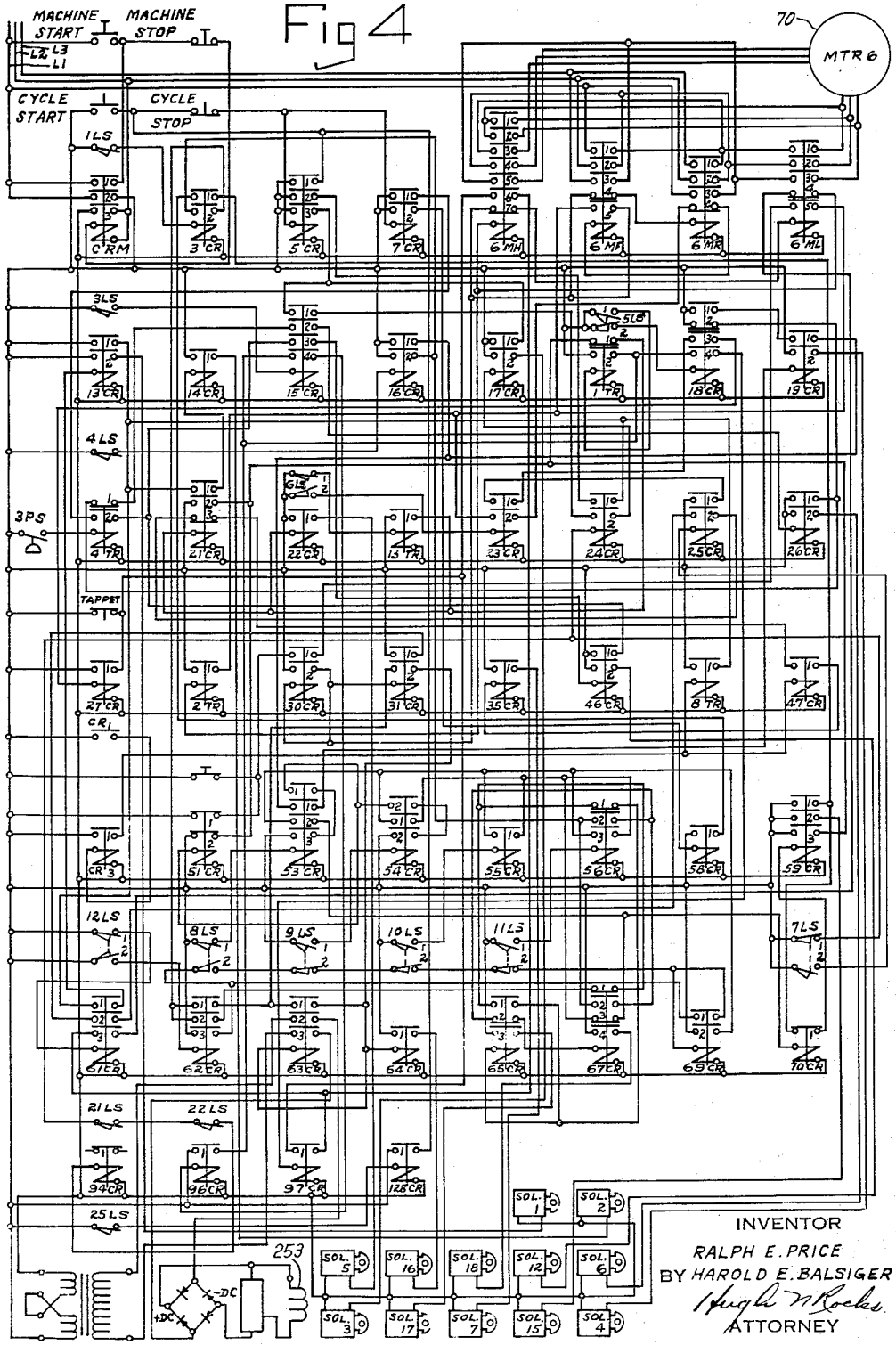
FIG. 4 is a diagram of the electrical circuit.

Bed member 50 has a work carriage 51 mounted for longitudinal movement thereon. Crankshaft W is rotatably supported on bed 50 in crankheads 60 and 61 by means of chucks 62 and 63 respectively. Chucks 62 and 63 consist of clamp arms 64 and 65 actuated by pistons 66 and 67.

The means for rotating a crankshaft includes a motor 70 mounted on crankhead 61 and connected through suitable gearing to the work drive spindles (not shown) on which chucks 62 and 63 are mounted.

Grinding wheel 80 is rotatably supported on grinding wheel support 81 which is movable transversely of work carriage 51. The means for driving grinding wheel 80 is a motor 82 mounted on wheel support 81.

The means for moving wheel support 81 transversely toward and from work carriage 51 is a piston 85 slidably mounted in cylinder 86 and connected directly or indirectly to wheel support 81 through piston rod 87.

The means for moving work carriage 51 longitudinally of grinding wheel 80 and for locating carriage 51 relative to grinding wheel 80 in order to place successive crankpins in operative relation to grinding wheel 80, consists of a piston 90 in cylinder 91 connected by means of piston rod 92 to work carriage 51.

Spacing bar 100 on work carriage 51 has spaced notches A, B, C, and D corresponding to the crankpins of a 4-throw crankshaft. Plunger 101 is arranged to enter each of said notches to locate work carriage 51 in position for grinding the corresponding crankpin on a crankshaft W. Cam 110 on spacing bar 100 serves to operate a plurality of limit switches 8LS, 9LS, 10LS, and 11LS, the function of which will be described later.

Positioner 150 is pivotally mounted at 151 on bridge member 152 which spans work carriage 51. Bridge member 152 has a front portion 153 attached to bed 50 and has a cylinder 154 pivotally mounted at 155 in said front portion 153. Piston 156 in cylinder 154 is connected through piston rod 157 to positioner 150. Adjustable stop 158 in bridge member 152 determines the extent of the clockwise movement of positioner 150 into operative position. Positioner 150 includes three work engaging members: a work rest, a caliper, and an axial locator, all in alignment with grinding wheel 80.

The work rest consists of a work rest shoe 160 held against an actuating wedge 161 by means of spring 162. Spring 163 serves to shift wedge 161 in a direction to advance work rest shoe 160. The means for moving wedge 161 in the opposite direction to permit retraction of work rest shoe 160 by spring 162 consists of a piston 164 in cylinder 165. Rod 166 of piston 164 abuts against wedge 161.

The means for advancing gage caliper 170 to engage a workpiece consists of a piston 171 in cylinder 172 and connected to said gage caliper 170 by means of piston rod 173.

The axial locator also mounted on positioner 150 is substantially identical with that disclosed in Patent 2,848,849, granted August 26, 1958, and consists of a pair of locator fingers 180 actuated through piston rod 181 by piston 182 in cylinder 183.

*Operation*

Closing the machine start switch energizes relay CRM which closes the circuit to the control panel.

The following relays are energized by the closing of relay contacts CRM2 and CRM3:

Control relay 3CR through wheelbase back, limit switch 1LS.

Relay 16CR through positioner down limit switch 4LS.

Relay 18CR through lateral locator limit switch contact 5LS2.

Latch control relay 19CR through relay contacts 16CR1 and 53CR1.

Timer relay 13TR through latch limit switch contact 6LS1.

Relay 21CR and clamp control relay 22CR through relay contact 13TR1, timed closed.

Clamp control relay 22CR held through relay contact 21CR2 and normally closed timer relay contact 1TR1 to open clamp arms 64 and 65.

Relay 24CR through clamp limit switch contact 7LS1.

Gage contact $CR_1$ is closed and caliper 170 energized through limit switch 1LS and an electronic circuit (not shown) when wheel support 81 is retracted.

Gage relay $CR_3$ when gage caliper 170 is energized and gage contact $CR_1$ is closed.

Relay 47CR through gage relay contact $CR_3$1.

Relay contact 47CR1 closes in the circuit to infeed relay 35CR.

Relay 53CR through index limit switch 8LS.

Control relay 51CR through rotary index contact #1 and relay contact 53CR1.

Relay 61CR through plunger limit switch contact 12LS1.

Closing the cycle start switch energizes control relays 5CR and 7CR.

When the machine is in automatic cycle, limit switch 25LS is closed when the loader retracts after placing an unground crank in the machine to complete a circuit to energize relay 128CR.

Loader relay contact 128CR1 which is in parallel with the manual cycle start switch, completes a circuit to energize relays 5CR and 7CR.

With the work carriage 51 in its left hand position, loader 185 places a crank W in the machine to grind the #1 pin at the right end of the crank.

Relay contact 5CR1 is a holding contact.

At the beginning of a grinding operation on a crankshaft with the crank in the #1 position, limit switch 8LS is closed and relay contact 53CR1 is energized.

So long as the positioner 150 is down, limit switch 4LS will complete a circuit to energize relay 16CR.

Relay contact 16CR1 will complete a circuit through relay contact 53CR1 to energize relay 19CR to hold latches 222 and 223 in retracted position.

Relay 19CR will be held through relay contacts 19CR1 and 18CR1 after positioner 150 moves up and deenergizes relay contact 16CR1.

With positioner 150 up, relay 15CR is energized and relay contact 15CR1 closes to energize locator relay 17CR.

When the locator functions, limit switch contact 5LS2 opens, deenergizing relay 18CR and opening relay contact 18CR1 to deenergize latch relay 19CR which permits the latches to move into operative position relative to clamp arms 64 and 65 after said clamps close in the #2 position.

Relay contact 5CR2 completes a circuit through previously closed relay contacts 24CR1 and 61CR1 to energize work positioner relay 13CR and through relay contact 21CR1 to work positioner pressure control relay 14CR.

Relay contact 7CR1 closes in a circuit to gage relay 46CR. The circuit is completed and relay 46CR energized only when positioner 150 is up and has closed limit switch 3LS to energize relay 15CR. Relay contact 15CR3 closes to complete a circuit to relay 46CR.

Relay contact 7CR2 closes to energize relay 58CR.

Relay contact 13CR1 is a holding contact.

Relay contact 13CR2 closes to energize positioner valve solenoid 1.

Pressure control relay contact 14CR1 closes to energize pressure control valve solenoid 2, shifting valve 200 to the left to direct low pressure fluid from relief valve 201 and positioner valve 260 to the lower end of positioner cylinder 154.

Positioner 150 moves up to position and work rest shoe 160 engages the pin to be ground and rotates crank W so that index plate 250 is held firmly against index plunger 251.

With positioner 150 in up position, limit switch 3LS is closed, completing a circuit to energize relay 15CR.

Relay contact 15CR1 is closed in a circuit with previously closed relay contacts 5CR3 and 24CR2 to energize locator relay 17CR.

Relay contact 17CR2 closes to energize locator valve solenoid 3.

Relay contact 17CR1 in parallel with relay contact 5CR3 is a holding contact.

Valve solenoid 3 shifts locator valve 210 to the left, directing fluid to the left end of locator cylinder 183 to advance locator fingers 180 into engagement with the work and to spread said fingers to shift the crankshaft into axial alignment with grinding wheel 80. Structural details of this locator are shown and described in U.S. Patent 2,848,849, granted August 26, 1958.

Locator limit switch contact 5LS1 is transferred to energize timer relay 1TR.

Locator limit switch contact 5LS2 opens a circuit to deenergize relay 18CR.

Relay contact 18CR1 opens in the circuit to latch relay 19CR.

Relay contact 19CR2 opens, deenergizing latch valve solenoid 4 and shifting latch valve 215 to the right. In this position, latch cylinders 220 and 221 are connected to exhaust and latches 222 and 223 move by springs 224 and 225 into engagement with clamp arms 64 and 65. However, latches 222 and 223 cannot move into latching position to prevent opening the clamp arms until clamp arms 64 and 65 move into contact with crank W.

Latch limit switch 6LS1 is transferred, opening the circuit to timer relay 13TR.

Relay contact 13TR1 opens in the circuit to relays 21CR and 22CR, but the circuit through relay contacts 21CR2 and 1TR1 holds said relays 21CR and 22CR.

Relay contact 1TR1 times open after locator fingers 180 has had time to position crank W, and is deenergized and closed when said locator 180 is retracted. Thus, the circuit through relay contacts 21CR2 and 1TR1 holds relays 21CR and 22CR until locator 180 has had time to position crank W axially.

Relay contact 1TR1 times out and opens the circuit to deenergize relays 21CR and 22CR after locator 180 has had time to position crank W relative to grinding wheel 80.

Relay contact 22CR1 opens and clamp valve solenoid 5 is deenergized. Valve 235 is shifted to the left, directing fluid under pressure to the left end of clamp valve 236 and shifting said clamp valve to the right. In this position, clamp valve 236 directs fluid under pressure to clamp pistons 66 and 67 to close clamp arms 64 and 65.

As clamp arms 64 and 65 close, latches 222 and 223 are free to move into position by springs 224 and 225 to prevent complete opening of clamp arms 64 and 65. With latches 222 and 223 in operative position, clamp arms 64 and 65 may be opened only enough to permit rotation of a crankshaft W for angular indexing.

When relay 18CR is deenergized by opening locator limit switch contact 5LS2, normally closed relay contact 18CR2 closes to complete a circuit through normally closed timer relay contact 4TR1 and relay contact 15CR2 to energize relay 26CR.

Relay contact 26CR1 is a holding contact.

Relay contact 26CR2 energizes work rest valve solenoid 6, shifting valve 230 to the left and directing fluid to the head end of work rest cylinder 165 to reverse wedge 161 so that spring 162 can retract work rest shoe 160. The rate of movement of wedge 161 is controlled by throttling the exhaust from cylinder 165 through throttle valve 167.

When timer relay contact 1TR1 opens to deenergize relay 21CR, relay contact 21CR1 opens and deenergizes relay 14CR and positioner pressure control valve solenoid 2. Valve 200 moves to the right to direct high pressure fluid to the lower end of positioner cylinder 154 to provide a solid support for positioner 150 when work rest shoe 160 engages crankshaft W during grinding.

When timer relay 1TR times out to operate chucks 62 and 63, relay contact 1TR2 closes to complete a circuit through previously closed relay contact 15CR4 to energize relay 96CR.

Relay contact 1TR2 also completes a circuit through previously closed relay contact 18CR4 to energize relay 97CR.

Relay contact 96CR1 in parallel with timer relay contact 1TR2 is a holding contact for relay 96CR.

When latch limit switch contact 6LS1 opens to deenergize relay 13TR in the clamp relay circuit, latch limit switch contact 6LS2 closes a circuit to energize relay 23CR.

Relay contact 23CR1 closes in the circuit to relay 27CR.

When clamp arms 64 and 65 close, clamp limit switch 7LS is transferred to deenergize relay 24CR and to energize relay 25CR.

Relay contact 24CR2 opens to deenergize locator relay 17CR and locator valve solenoid 3. Locator valve 210 moves to the right and directs fluid under pressure to the right end of locator cylinder 183 retracting locator fingers 180.

Relay contact 25CR1 completes a circuit through previously closed relay contacts 23CR1 and 18CR3 to energize relay 27CR.

Relay contact 27CR1 is closed to complete a circuit through previously closed relay contact 97CR1 and normally closed relay contact 6ML4 to energize relays 2TR and 6MH.

Relay contact 2TR1 closes to complete a circuit through previously closed relay contact 23CR2 and normally closed relay contact 6MR4 to energize motor relay 6MF.

Contacts of relays 6MF and 6MH complete a circuit to start work drive motor 70 at high or operating speed.

Relay contact 6MF5 completes a circuit from relay contact 2TR1 to energize relays 30CR and 31CR.

Relay contact 30CR1 is closed in another circuit to relay 6MF.

Relay contact 30CR2 is a holding contact for relays 30CR and 31CR.

Relay contact 31CR1 closes to complete a circuit through previously closed relay contacts 61CR2 and 25CR2, normally closed relay contact 21CR3 and previously closed relay contact 47CR1 to energize infeed relay 35CR and infeed valve solenoid 7.

Valve solenoid 7 shifts infeed pilot valve 240 to the right, directing fluid to the right hand end of infeed reversing valve 241, shifting said reversing valve to the left and directing fluid under pressure to the right end of feed cylinder 86 to advance piston 85 and grinding wheel 80 for a grinding operation.

At a predetermined point in the grinding operation, pressure switch 3PS closes to energize timer relay 4TR.

Relay contact 4TR2 closes after a predetermined interval during which the advance of feed piston 85 is stopped while grinding wheel 80 sparks out for what is generally referred to as a roundout operation, to complete a circuit through control relay contact 7CR1 and relay contact 15CR3 to energize gage relay 46CR.

Relay contact 46CR1 is a holding contact.

Relay contact 46CR2 completes a circuit to energize gage valve solenoid 12, shifting valve 245 to the left and directing fluid to the left end of gage cylinder 172, advancing gage caliper 170 into contact with crankshaft W. The gage circuit is energized when wheel support 81 is retracted and thus gage contact $CR_1$ is closed before caliper 170 engages crank W.

At the same time, normally closed timer relay contact 4TR1 opens in the circuit to work rest control relay 26CR, deenergizing said relay and valve solenoid 6 to connect the head end of work rest cylinder 165 with exhaust so that spring 163 may shift wedge 161 to advance work rest shoe 160 into engagement with crankshaft W to support said crankshaft during a grinding operation.

When crankshaft W is ground to size, contact $CR_1$ opens in the circuit to gage relay $CR_3$.

Gage relay contact $CR_3$1 opens to deenergize relay 47CR.

Relay contact 47CR1 in the circuit to infeed relay 35CR opens, deenergizing relay 35CR and infeed valve solenoid 7 to reverse the flow of fluid to feed cylinder 86 and withdraw grinding wheel 80.

Timer relay 8TR, which is connected in parallel with relay 47CR, is deenergized at the same time as relay 47CR.

Relay contact 8TR1 holds positioner relay 13CR through relay contact 61CR1 for a predetermined interval after wheel retraction.

Relay contact 8TR1 then times open, deenergizing positioner relay 13CR and valve solenoid 1. Positioner valve 260 shifts to the right, directing fluid under pressure to the upper end of positioner cylinder 154 to retract positioner 150.

When wheel support 81 moves back, it closes limit switch 1LS and completes a circuit to energize relay 3CR. Limit switch 1LS also operates through an electronic circuit (not shown) to close gage contact $CR_1$.

Relay contact 3CR1 completes a circuit which includes previously closed relay contact 58CR1 and normally closed relay contact 70CR1 to energize plunger relay 59CR and through relay contact 54CR1 to energize plunger valve solenoid 15 through relay contact 59CR2.

Valve solenoid 15 shifts valve 265 to the left and directs fluid under pressure to shift pressure operated plunger valve 266 to the right. Valve 266 directs fluid under pressure to the top of plunger cylinder 102 to withdraw plunger 101 from the #1 position on spacing bar 100.

When plunger relay 59CR is energized, relay contact 59CR3 completes a circuit to energize clamp relay 22CR to open clamp arms 64 and 65.

Latches 222 and 223 remain in position so that clamp arms 64 and 65 open only enough to permit rotary index of the crankshaft W when index brake 253 is energized.

Plunger limit switch contact 12LS1 opens to deenergize relay 61CR and closes to energize relay 62CR.

Relay contact 61CR3 opens in the circuit to timer relay 2TR and motor relay 6MH to deenergize both relays.

Normally closed relay contact 6MH7 closes to energize relay 6ML to change work drive motor 70 to slow speed for rotary index.

Relay contact 6ML5 closes to hold relay 6ML and relay contact 2TR1 times open.

Before carriage 51 can be shifted to the right to the next position and the rotary index of crankshaft W effected, positioner 150 must be retracted as described above.

In retracted position, positioner 150 closes limit switch 4LS which completes a circuit to energize relay 16CR.

Relay contact 16CR2 completes a circuit through relay contacts 3CR2, 62CR1 and 31CR2 to energize index brake relay 63CR, index relay 64CR and traverse right relay 65CR.

Relay contact 64CR1 completes a circuit to energize index valve solenoid 16.

Relay contact 63CR1 is a holding contact.

Relay contacts 63CR2 and 63CR3 complete a circuit to energize index brake 253. Brake 253 consists of a stationary part and a rotatable part, which is connected to index plate 250. When energized, the rotatable part and index plate 250 and crank W are slowed down or stopped.

Brake 253 retards rotation of shaft 254 on which intermediate index gear 252 is mounted so that rotation of index plate 250 and crankshaft W is retarded and the resulting rotation of chucks 62 and 63 relative to the work brings another crankpin into alignment with the axis of rotation of the work clamp fixtures.

Valve solenoid 16 shifts valve 270 to the left, directing fluid to the left end of timing valve 271.

Valve 271 and plunger 272 are held in the left hand position by one of the lobes of timing cam 273 which rotates with the chucks. When the cam lobe travels an angular distance corresponding to the angular distance between successive crankpins, it releases plunger 272, and the pressure at the left hand end of plunger 272 shifts said plunger to the right and connects the upper end of rotary index plunger cylinder 280 with exhaust.

Rotary index plunger 251 which is rotating with chucks 62 and 63, is moved by spring 282 into position to firmly engage one of the abutments on index plate 250 which has been retarded or stopped by brake 253. Brake 253 is then deenergized and index plate 250 and crank W resume rotation with chucks 62 and 63 and with the #2 crankpin aligned with the chuck axis. In this case, the index movement stops with the #2 crankpin in alignment, and the rotary index contact #2 closed.

Relay contact 65CR3 completes a circuit to energize traverse right valve solenoid 17.

Valve solenoid 17 shifts traverse pilot valve 290 to the left, directing fluid under pressure to the left hand end of traverse reversing valve 291, shifting said reversing valve to the right. In the right hand position, valve 291 directs fluid under pressure to the left hand end of traverse cylinder 91 to shift piston 90 and carriage 51 to the right.

As soon as carriage 51 begins to move from the #1 position to the #2 position, limit switch contact 8LS1 opens, deenergizing relay 53CR.

Limit switch contact 8LS2 closes, completing a circuit from previously closed relay contact 62CR3 and through limit switches 9LS, 10LS and 11LS to relay 69CR.

Relay contact 69CR1 is a holding contact.

Relay contact 69CR2 closes in the circuit to relay

70CR. This circuit includes contacts 53CR2, 54CR1, 55CR1 and 56CR3 in parallel.

When carriage 51 approaches the #2 position, limit switch contact 9LS1 is closed, energizing relay 54CR.

Limit switch contact 9LS2 is opened in the circuit to relay 69CR.

However, relay 69CR remains energized through holding contact 69CR1.

Relay contact 54CR2 in the circuit with rotary index contact #2 completes a circuit to energize relay 51CR.

Normally closed relay contact 51CR1 opens in the circuit to relay 6MF.

Normally closed tappet switch T in parallel with normally closed relay contact 51CR1 opens the circuit momentarily and relay 6MF is momentarily deenergized. At this point, well known standard control elements (not shown) function to stop headstock motor 70 with crankshaft W in a predetermined angular position.

Relay 54CR is energized by the closing of rotary index contact #2 and index limit switch 9LS when the rotary and longitudinal index movement, to position crankpin #2, is completed and just before the longitudinal index movement is completed by entry of plunger 101 into notch B.

Relay contact 54CR1 closes to energize relay 70CR.

Normally closed relay contact 70CR1 opens to deenergize relay 59CR and valve solenoid 15 to release plunger 101 against spacing bar 100 so that it will enter the #2 notch when carriage 51 moves into that position.

When valve solenoid 15 is deenergized, valve 265 moves to the right and directs fluid under pressure to the right hand end of valve 266. At the same time, the opposite end of valve 266 is connected to exhaust. Check valve VC in the exhaust line prevents a free flow of exhaust fluid by exhaust through a throttle valve. As valve 266 moves to the left, its tapered portion gradually cuts off the advance flow of fluid from traverse cylinder 91 to cushion the traverse movement just before plunger 101 enters the notch.

When plunger 101 enters the #2 notch, in spacing bar 100, plunger limit switch contact 12LS1 completes a circuit to energize relay 61CR. Relay contact 61CR1 completes a circuit from relay contact 5CR2 through relay contact 24CR1 to energize positioner relay 13CR.

When positioner 150 advances to operative position with work rest shoe 160 advanced to engage the #2 crankpin, it effects a precision rotary index of the crankshaft W to insure that the #2 crankpin is in axial alignment with the axis of rotation of chucks 62 and 63. By this movement, positioner 150 closes limit switch 3LS to energize relay 15CR. Relay contact 15CR1 completes a circuit from relay contacts 5CR2 and 24CR2 to energize locator relay 17CR and locator valve solenoid 3.

Locator fingers 180 function to align crankshaft W with grinding wheel 80 and when reset, locator fingers 180 and latch limit switch 6LS initiate the closing of clamp arms 64 and 65.

Relay contact 54CR2 in the circuit with rotary index contact #2 corresponding to the #2 pin, completes a circuit to energize relay 51CR.

Thus, relay contact 54CR1 completes a circuit through normally closed relay contact 67CR3 to energize relay 70CR. Normally closed relay contact 70CR1 opens to release plunger 101 to stop carriage 51 with the #2 crank in line with grinding wheel 80.

Relay contact 54CR2 relates the #2 position of carriage 51 with the #2 rotary position of the crank, and when the #2 pin is on center, a circuit is completed through the #2 contact to energize relay 51CR.

Normally closed relay contact 51CR2 opens in the circuit through normally closed timer relay contact 1TR1 to clamp relay 22CR.

Relay 22CR is held by plunger relay contact 59CR3 and relay contact 21CR2 through normally closed timer relay contact 1TR1.

Clamp arms 64 and 65 do not close until locator limit switch 5LS energizes relay 1TR which times open after locator fingers 180 are retracted.

Clamp relay 22CR is then deenergized and clamp arms 64 and 65 closed with the crank in position for grinding the #2 pin. The sequence of operation from the #2 pin to the #3 pin is the same as from the #1 pin to the #2 pin. Limit switch 10LS and relay 55CR serve the same purpose as limit switch 9LS and relay 54CR.

When carriage 51 moves into position to grind the #4 and last pin, limit switch contact 11LS1 closes to energize relay 56CR.

Relay contact 56CR2 closes in the circuit to traverse left relay 67CR.

However, relay 67CR is not energized until positioner 150 is retracted, closing positioner down limit switch 4LS and energizing relay 16CR.

Relay contact 16CR2 then closes to energize relay 67CR and traverse left valve solenoid 18, shifting traverse pilot valve 290 to the right and traverse reversing valve 291 to the left to direct fluid to the right end of traverse cylinder 91 to move carriage 51 to the left.

This traverse movement is similar to previous traverse movements from pin to pin in that clamp arms 64 and 65 are partially open and the rotary index is actuated.

It differs from previous index operations in that plunger 101 is held retracted until carriage 51 returns to the #1 position, by the opening of normally closed relay contact 67CR3 which is in series with parallel relay contacts 54CR1, 55CR1 and 56CR3.

When carriage 51 approaches the #1 position, limit switch contact 8LS1 is closed, energizing relay 53CR and closing relay contact 53CR2 in the circuit to relay 70CR.

Normally closed relay contact 70CR1 is opened to deenergize plunger relay 59CR and plunger valve solenoid 15 to permit plunger 101 to move upwardly into engagement with spacing bar 100.

When plunger 101 drops into the #1 notch of spacing bar 100, plunger limit switch contact 12LS2 opens to deenergize relay 62CR.

Relay contact 62CR2 opens in the circuit to traverse left relay 67CR to deenergize said relay and valve solenoid 18 so that traverse reversing valve 291 returns to central position.

When plunger relay 59CR is deenergized, relay contact 59CR3 in the circuit to clamp relay 22CR is deenergized.

Normally closed relay contact 51CR1 remains open until carriage 51 reaches the #1 position because the contacts corresponding to the #2, #3 and #4 positions are in series with normally closed relay contact 67CR1 which is opened, and relay 70CR is deenergized and normally closed relay contact 70CR1 is closed to hold plunger 101 retracted.

Relay contact 53CR1 closes in the #1 position to energize latch relay 19CR and latch valve solenoid 4 to retract latches 222 and 223 and permit complete opening of clamp arms 64 and 65.

Relay 51CR is deenergized and normally closed relay contact 51CR2 closes the circuit through normally closed timer relay contact 1TR1 to energize clamp relay 22CR to open clamp arms 64 and 65.

Pressure operated clamp limit switch contact 7LS1, in response to the drop in pressure on clamp pistons 66 and 67, closes in a circuit which includes normally closed, clamp open limit switches 21LS and 22LS to energize loader relay 94CR.

Relay 94CR operates through a suitable circuit disclosed in co-pending application, Serial No. 70,197, filed November 18, 1960 to operate the loading mechanism 185 to remove the finished crankshaft from the machine.

A new cycle will not begin until loader 185 retracts after placing another crank W in the machine. When the loader 185 retracts, limit switch 25LS closes to energize relay 128CR and relay contact 128CR1 closes to start the cycle by energizing relays 5CR and 7CR.

We claim:

1. A machine for grinding a plurality of crankpins on a crankshaft comprising a base, a work support slidably mounted on said base, a pair of pot chucks rotatably mounted in axial alignment on said work support, a work drive motor, a hydraulically operated clamping arm on each of said pot chucks, latching devices for limiting the movement of said clamping arms, a grinding wheel support, a grinding wheel rotatably mounted on said grinding wheel support, means for effecting relative transverse and longitudinal movements of said supports, means for stopping said longitudinal movement in predetermined positions to locate each of said crankpins in operative relation with said grinding wheel including a work support plunger, and means on said work support for co-acting with said plunger, means to cause relative rotation between said crankshaft and said chucks to index said crankshaft about its axis to place the next crankpin in axial alignment with said pot chucks, a rotary positioner for holding said crank rotatably against a locating device to locate a crankpin in precise axial alignment with the axis of said chucks, an axial locator for positioning said crankpin in alignment with said grinding wheel, a steady rest and a caliper, both of which are movable toward and from the crankpin, a control device operable after a crank has been placed in said pot chucks to actuate said positioner, control means actuated by said positioner to actuate said axial locator, control means actuated by said axial locator to close said clamps and latches, control means operable upon the closing of said clamps to start said work drive motor, means operable when said work drive motor is started, to advance said grinding wheel support for a grinding operation, control means operable at a predetermined point in said grinding operation for actuating said steady rest and caliper to engage the crankpin, control means operable by said caliper when the desired work size is reached to retract said grinding wheel, and after a predetermined interval, to retract said positioner, control means operable upon retraction of said grinding wheel support for withdrawing said work support plunger, control means operable by the withdrawal of said work support plunger to open said clamps to the extent permitted by said latches, control means operable in response to withdrawal of said work support plunger to change the work drive motor to slow speed during said relative rotation between a crankshaft and said chucks, a rotary index control means operable upon retraction of said positioner to actuate said rotary index means to effect relative angular movement between said crankshaft and said pot chucks to place the next crankpin in axial alignment with the axis of rotation of said chucks and also to start said longitudinal movement in a direction to place the next crankpin in operative relation to said grinding wheel, said longitudinal movement continuing until it is stopped by the return of said work support plunger, and control means operable by the return of said work support plunger to actuate said positioner for the beginning of the grinding cycle on the next pin.

2. A machine for grinding a plurality of crankpins on a crankshaft comprising a base, a work support slidably mounted on said base, a pair of pot chucks rotatably mounted in axial alignment on said work support, a work drive motor, a hydraulically operated clamping arm on each of said pot chucks, latching devices for limiting the movement of said clamping arms, a grinding wheel support, a grinding wheel rotatably mounted on said grinding wheel support, means for effecting relative transverse and longitudinal movements of said supports, means for stopping said longitudinal movement in predetermined positions to locate each of said crankpins in operative relation with said grinding wheel including a work support plunger, and means on said work support for co-acting with said plunger, means to cause relative rotation between said crankshaft and said pot chucks to index said crankshaft about its axis to place the next crankpin in axial alignment with said pot chucks, a rotary positioner for holding said crank rotatably against a locating device to locate a crankpin in axial alignment with the axis of said pot chucks, an axial locator for positioning said crankpin in alignment with said grinding wheel, a steady rest and a caliper, both of which are movable toward and from the crankpin, a control device operable after a crank has been placed in said pot chucks to actuate said positioner, control means actuated by said positioner to actuate said axial locator, control means actuated by said axial locator to close said clamps and latches, control means operable upon the closing of said clamps to start said work drive motor, means operable when said work drive motor is started to advance said grinding wheel support for a grinding operation, control means operable at a predetermined point in said grinding operation for actuating said steady rest and caliper to engage the crankpin, control means operable by said caliper when the desired work size is reached to retract said grinding wheel, and after a predetermined interval, to retract said positioner, control means operable upon retraction of said grinding wheel support for withdrawing said work support plunger, control means operable by the withdrawal of said work support plunger to open said clamps to the extent permitted by said latches, control means operable in response to withdrawal of said work support plunger to change the work drive motor to slow speed for rotary indexing, a rotary index control means operable upon retraction of said positioner to actuate said rotary index means to effect relative angular movement between said crankshaft and said pot chucks to place the next crankpin in axial alignment with the axis of rotation of said pot chucks and also to start said longitudinal movement in a direction to place the next crankpin in operative relation to said grinding wheel, said longitudinal movement continuing until it is stopped by the return of said work support plunger, and control means operable by the return of said work support plunger to actuate said positioner for the beginning of the grinding cycle on the next pin, control means operable after the last pin has been ground to retract said grinding wheel, positioner and plunger, to reverse said longitudinal movement, and actuate said rotary index means and to hold said plunger in retracted position until said carriage returns to the #1 position, control means operable in the #1 position to cause return of said plunger, control means operable upon return of said crankshaft to the #1 position to stop said rotary index means and to stop said relative angular movement with said #1 pin in axial alignment with said axis of rotation of said pot chucks, and withdraw said latches to permit complete opening of said pot chucks, means operable when both rotary and longitudinal index movements have been completed to open said pot chucks, and a loader control means actuated by the opening of said pot chucks.

3. In a machine for grinding a plurality of crankpins on a crankshaft, a base, a work support slidably mounted on said base, means for rotatably supporting a workpiece on said work support, a grinding wheel support slidably mounted on said base, a grinding wheel rotatably mounted on said grinding wheel support, means for effecting relative transverse and longitudinal movements of said supports, chucks on said work support for holding a crankshaft in position to submit each of said crankpins on said crankshaft to a grinding operation, a motor for rotating said chucks and said crankshaft, means for placing a crankshaft in said chucks, a locating means on one of said chucks, a means on said crankshaft co-acting with said locating means, means to apply a turning force to said crankshaft to turn it in said chuck to effect a precision alignment of the crankpin axis with the axis of rotation of said chucks, means operable after placing a crankshaft in said chucks to shift said crankshaft axially in said chucks to align said crankpin with said grinding wheel, means actuated by said aligning means to close said chucks, a control device actuated by closing said chucks to start said work rotating motor, a control member actuated by said motor to start said transverse movement of said grinding wheel support and said grinding wheel to grind a crankpin, a steady rest and means operable at an intermediate point in the feeding movement to advance said steady rest to engage the crankshaft to hold it against the action of said grinding wheel, a sizing control member movable to engage said crankshaft, said size control member being operable when a crankpin is to size, to retract said grinding wheel support, control means operable by retraction of said grinding wheel support to open said chucks, means to limit the extent of opening of said chucks, means to effect relative rotation between said chucks and said crankshaft to place another crankpin in alignment with the axis of rotation of said chucks, means operable also in response to retraction of said grinding wheel support to actuate said longitudinal moving means to place said crankpin in approximate axial alignment with said grinding wheel, means actuated by said precision rotary aligning means to actuate said axial locating means to align said other crankpin with said grinding wheel, control means actuated by said axial locating means to close said chucks and repeat the previously described grinding cycle, means operable when the last crankpin is ground, to reverse said longitudinal and said transverse moving means and to actuate said rotary aligning means to return said crankshaft to starting position longitudinally and rotatably, control means operable at the end of said return movement to open said chucks and a loader control means actuated by the opening of said chucks.

4. In a machine for grinding a plurality of crankpins on a crankshaft, a base, a work support slidably mounted on said base comprising a pair of pot chucks rotatably mounted in axial alignment on said work support for supporting a crankshaft in successive angular positions with each of the crankpins in axial alignment with the axis of said pot chucks, a hydraulic operated clamping arm on each of said pot chucks, means for rotatably supporting a crankshaft on said work support, a grinding wheel support slidably mounted on said base, a grinding wheel rotatably mounted on said grinding wheel support, means for effecting relative transverse and longitudinal movements of said supports, means to control said longitudinal movement to locate each of said crankpins successively in alignment with said grinding wheel, a size control member operable when a crankpin is to size to retract said grinding wheel support and to actuate said longitudinal moving means to position another crankpin relative to said grinding wheel, positioning means to stop said longitudinal movement when said crankpin has moved into approximate axial alignment with said grinding wheel, means responsive to said stopping means to actuate said axial locating means to effect a more precise alignment of said crankshaft and said grinding wheel, and means responsive to said locating means to close said clamping arms and actuate said transverse moving means to perform a grinding operation on the next crankpin.

5. In a machine for grinding a plurality of crankpins on a crankshaft, a base, a work support slidably mounted on said base comprising a pair of pot chucks rotatably mounted in axial alignment on said work support for supporting a crankshaft in successive angular positions with each of the crankpins in axial alignment with the axis of said pot chucks, a hydraulic operated clamping arm on each of said pot chucks, a grinding wheel support slidably mounted on said base, a grinding wheel rotatably mounted on said grinding wheel support, means for effecting relative transverse and longitudinal movements of said supports, means to control said longitudinal movement to locate each of said crankpins successively in alignment with said grinding wheel, a size control member operable when a crankpin is to size to retract said grinding wheel support, control means actuated by said size control member to effect relative rotation between said pot chucks and said crankshafts to place the next crankpin in alignment with the axis of rotation of said pot chucks and to actuate said longitudinal moving means to position another crankpin, means to stop said longitudinal movement when said crankpin has moved axially into approximate alignment with said grinding wheel, means responsive to said stopping means to shift said crankshaft axially to effect a more precise alignment of said crankshaft and said grinding wheel, and means responsive to said axial shifting means to close said clamping arms and actuate said transverse moving means to perform a grinding operation on said next crankpin.

6. In a machine for grinding crankpins of automotive crankshafts, a base, a work support slidably mounted on said base, means for rotatably supporting a crankshaft on said work support, a motor for rotating said crankshaft, chucks on said work support for holding a crankshaft in successive positions with the axis of each crankpin in alignment with the axis of said chucks, means to cause relative rotation of said chucks and said crankshaft to effect a rotary index of said crankshaft to place the next crankpin in axial alignment with said chucks, a grinding wheel support slidably mounted on said base, a grinding wheel rotatably mounted on said grinding wheel support, means for effecting relative transverse and longitudinal movements of said supports, a caliper, and means operable by said caliper when a crankpin is ground to size to retract said grinding wheel, to cause said longitudinal movement to a predetermined position, reduce work speed and cause said relative rotation of said chucks and said crankshaft to place another crankpin in grinding position.

7. In a machine for grinding crankpins of automotive crankshafts, a base, a work support slidably mounted on said base, means for rotatably supporting a crankshaft on said work support, a motor for rotating said crankshaft, chucks on said work support for holding a crankshaft in successive positions with the axis of each crankpin in alignment with the axis of said chucks, means to cause relative rotation of said chucks and said crankshaft to effect a rotary index of said crankshaft to place the next crankpin in axial alignment with the axis of said chucks, and means responsive to the means for causing said rotary index for reducing the rate of rotation of said motor while said rotary index is taking place.

8. In a machine for grinding crankpins of automotive crankshafts, a base, a work support slidably mounted on said base, means for rotatably supporting a workpiece on said work support, a motor for rotating said crankshaft, chucks on said work support for holding a crankshaft in successive positions with the axis of each crankpin in alignment with the axis of said chucks, means to cause relative rotation of said chucks and said crankshaft to effect a rotary index of said crankshaft to place another crankpin in axial alignment with said chucks, a grinding wheel support slidably mounted on said base, a grinding wheel rotatably mounted on said grinding wheel support, means for feeding said grinding wheel support transversely for a grinding operation, means to move said work support longitudinally, a caliper operable when a crankpin is ground to size to cause said transverse and longitudinal movements and said relative rotation of said chucks and said crankshaft in predetermined sequence to place said other crankpin in angular and longitudinal positions relative to said grinding wheel for performing a grinding operation on the said other crankpin.

9. In a machine for grinding crankpins of automotive crankshafts, a base, a grinding wheel support slidably mounted on said base, a grinding wheel rotatably mounted on said grinding wheel support, a work support slidably mounted on said base, means for effecting relative longitudinal and transverse movements of said supports, means for rotatably supporting a crankshaft on said work support, a motor for rotating said crankshaft, a chucks on said work support for holding a crankshaft in successive angular positions with the axis of each crankpin in alignment with the axis of said chucks, means to cause relative rotation of said chucks and said crankshaft to effect a rotary index of said crankshaft to place the next crankpin in axial alignment with said chucks, a caliper for engaging a crankpin and operable when said crankpin is ground to size to cause said relative transverse and longitudinal movements and said rotary index movement in predetermined sequence to place another crankpin in proper angular and longitudinal relation to said grinding wheel for performing a grinding operation on said crankpin.

10. In a machine for grinding crankpins of automotive crankshafts, a base, a work support slidably mounted on said base, means for rotatably supporting a crankshaft on said work support, a motor for rotating said crankshaft, a grinding wheel support slidably mounted on said base, a grinding wheel rotatably mounted on said grinding wheel support, means for effecting relative transverse and longitudinal movements of said supports to successively position each of said crankpins relative to said grinding wheel and to perform a grinding operation on each of said crankpins, chucks on said work support for holding a crankshaft in successive positions with the axis of each crankpin in axial alignment with the axis of said chucks, a caliper operable when a crankpin is ground to size to reverse said transverse moving means to retract said grinding wheel, means actuated by said caliper to cause relative rotation of said chucks and said crankshaft to effect a rotary index of said crankshaft to place the next crankpin in axial alignment with said chucks, control means also actuated by said caliper to effect said longitudinal movement to position the next crankpin relative to said grinding wheel, means operable at this point to stop said work rotating motor, means operable after said motor has stopped for performing one or more precision adjustments of said crankshaft, and means operable upon completion of said adjustments to resume rotation of said crankshaft and to effect said transverse movement to perform a grinding operation on the next crankpin.

11. In a machine for grinding crankpins of automotive crankshafts, a base, a work support slidably mounted on said base, means for rotatably supporting a crankshaft on said work support, a grinding wheel support slidably mounted on said base, a grinding wheel rotatably mounted on said grinding wheel support, means for effecting relative transverse and longitudinal movements of said supports, chucks on said work support for holding a crankshaft in successive angular positions to align the axis of each crankpin with the axis of said chucks, means to control said longitudinal movement to position each of said crankpins in alignment with said grinding wheel, a size control member operable when a crankpin is ground to size to cause said transverse movement to retract said grinding wheel, control means actuated by said size control to effect relative rotation of said chucks and said crankshaft to place the next crankpin in alignment with the axis of rotation of said chucks, means operable by said size control member to actuate said longitudinal moving means to position the next crankpin axially relative to said grinding wheel, means to stop said longitudinal movement when said crankpin has moved into axial alignment with said grinding wheel, a locating device, means responsive to said stopping means to actuate said locating device to effect precision longitudinal location of said crankpin and said grinding wheel, and means actuated by operation of said locating device to close said chucks and to actuate said transverse moving means to perform a grinding operation on the next crankpin.

12. In a grinding machine, a base, a work support thereon, means for rotatably supporting a workpiece on said work support, a grinding wheel support on said base, means for rotatably supporting a grinding wheel on said grinding wheel support, means for locating a workpiece axially relative to said grinding wheel, a steady rest for supporting a workpiece during a grinding operation, a caliper for measuring said workpiece, a common support for said locating means, said steady rest and said caliper, said locating means, steady rest, and caliper each having its own actuating means, means to advance said common support into operative position, and control means operable at predetermined points in the operating cycle to advance said locating means, said steady rest and said caliper into operative relation with said workpiece.

13. A machine for grinding a plurality of crankpins on a crankshaft starting with one end pin and successively grinding the other pins, ending with the other end pin comprising a base, a work support slidably mounted on said base, a pair of pot chucks rotatably mounted in axial alignment on said work support, a work drive motor, a hydraulically operated clamping arm on each of said pot chucks, latching devices for limiting the movement of said clamping arms, a grinding wheel support, a grinding wheel rotatably mounted on said grinding wheel support, means for effecting relative transverse and longitudinal movements of said supports, means for stopping said longitudinal movement in predetermined positions to locate each of said crankpins in operative relation with said grinding wheel including a rotary index means, a work support plunger, and means on said work support for co-acting with said plunger, control means operable after the other end pin has been ground to reverse said longitudinal movement and actuate the rotary index means, and to hold said plunger in retracted position until said carriage returns to the starting position, and control means operable upon return of said work support to the starting position for opening said pot chucks to release the workpiece.

14. In a machine for grinding a plurality of axially spaced portions on a workpiece, a base, a work support on said base, means for rotatably supporting a workpiece on said work support, a grinding wheel support on said base, a grinding wheel rotatably mounted on said wheel support, means for effecting relative transverse and longitudinal movements of said supports, means to control said longitudinal movement to locate each of said portions successively in alignment with said grinding wheel, a size control member mounted in fixed axial relation to said grinding wheel and operable when a portion is to size to retract said wheel support and to actuate said longitudinal moving means to position another portion relative to said grinding wheel, means to stop said longitudinal movement when said portion and said grinding wheel are in approximate axial alignment, and means responsive to said stopping means to actuate said transverse moving means to perform a grinding operation on said other portion.

15. In a machine for grinding crankpins of automotive crankshafts, a base, a work support on said base, means for rotatably supporting a crankshaft on said work support, a motor for rotating said crankshaft, chucks on said work support for holding a crankshaft in successive positions with the axes of each crankpin in alignment with the axis of said chucks, means to cause relative rotation of said chucks and said crankshaft to effect a rotary index of said crankshaft to place the next crankpin in axial alignment with said chucks, a grinding wheel support on said base, a grinding wheel rotatably mounted on said wheel support, means for effecting relative transverse and longitudinal movements of said supports, and a caliper operable when a crankpin is ground to size to separate said grinding wheel and said work support, to cause said longitudinal movement to a predetermined position, reduce work speed, and cause relative rotation of said chucks and said crankshaft to place another crankpin in axial alignment with said chucks.

16. In a machine for grinding crankpins of automotive crankshafts, a base, a work support on said base, means for rotatably supporting a crankshaft on said work support, a motor for rotating said crankshaft, chucks on said work support for holding a crankshaft in successive positions with the axis of each crankpin in alignment with the axis of said chucks, means to cause relative rotation of said chucks and said crankshaft to effect a rotary index of said crankshaft to place the next crankpin in axial alignment with said chucks, a grinding wheel support on said base, a grinding wheel rotatably mounted on said wheel support, means for effecting relative transverse and longitudinal movements of said supports, and a caliper operable when a crankpin is ground to size to separate said grinding wheel and said work support, to cause said longitudinal movement to a predetermined position and cause relative rotation of said chucks and said crankshaft to place another crankpin in axial alignment with said chucks.

17. In a machine for grinding crankpins of automotive crankshafts, a base, a grinding wheel support slidably mounted on said base, a grinding wheel rotatably mounted on said wheel support, a work support slidably mounted on said base, means for effecting relative transverse and longitudinal movements of said supports, means for rotatably supporting a crankshaft on said work support, a motor for rotating said crankshaft, chucks on said work support for holding a crankshaft in successive angular positions with the axis of each crankpin in alignment with the axis of said chucks, means to cause relative rotation of said chucks and said crankshaft to effect a rotary index of said crankshaft to place the next crankpin in axial alignment with said chucks, a caliper for engaging a crankpin and operable when said crankpin is ground to size to cause said relative transverse and longitudinal movements and said rotary index movement in predetermined sequence to place another crankpin in proper angular and longitudinal relation to said grinding wheel for performing a grinding operation on said crankpin, an electrical circuit for said motor, and contacts in said circuit operable by said rotary and longitudinal index means to stop said motor.

18. In machine for grinding crankpins of automotive crankshafts, a base, a work support on said base, means for rotatably supporting a crankshaft on said work support, a motor for rotating said crankshaft, a grinding wheel support on said base, a grinding wheel rotatably mounted on said wheel support, means for effecting relative transverse and longitudinal movements of said supports to successively position each of said crankpins relative to said grinding wheel and to perform a grinding operation on each of said crankpins, chucks on said work support for holding a crankshaft in successive positions with the axis of each crankpin in axial alignment with the axis of said chucks, a caliper operable when a crankpin is ground to size to reverse said transverse moving means to retract said grinding wheel, means actuated by said caliper to cause relative rotation of said chucks and said crankshaft to effect a rotary index of said crankshaft to place the next crankpin in axial alignment with said chucks, control means also actuated by said caliper to effect said longitudinal movement to position the next crankpin relative to said grinding wheel, and means operable in response to the completion of said rotary and longitudinal movements to stop said work rotating motor.

19. In a machine for grinding crankpins on a crankshaft, a base, a work support on said base, means for rotatably supporting a crankshaft on said work support including chucks for holding a crankshaft in successive angular positions to align the axis of each crankpin with the axis of said chucks, means for rotating said chucks, a grinding wheel support on said base, a grinding wheel rotatably mounted on said wheel support, means for effecting relative transverse and longitudinal movements of said supports, means to control said longitudinal movement to position each of said crankpins in alignment with said grinding wheel, a size control member operable when a crankpin is ground to size to cause said transverse movement to separate said wheel support and said work support, control means actuated by said size control member to effect relative rotation of said chucks and said crankshaft to place the next crankpin in alignment with the axis of rotation of said chucks, other control means operable by said size control member to actuate said longitudinal moving means to position the next crankpin and said grinding wheel in operative relation, means to stop said longitudinal movement when said crankpin and said grinding wheel are in axial alignment, a locating device, and means actuated by said stopping means to actuate said locating device to effect precision longitudinal location of said crankpin and said grinding wheel.

20. In a grinding machine for grinding workpieces, a base, a work support mounted on said base, means for rotatably supporting a workpiece on said work support including clamping means, a grinding wheel support on said base, means for rotatably supporting a grinding wheel on said base, a steady rest for supporting a workpiece during a grinding operation, a work engaging member on said steady rest movable between advance and retract positions, a movable support for said steady rest, pressure operated means to advance said movable support to move said steady rest with the work engaging member in advance position to engage a workpiece for precision angular location of said workpiece, control means to thereafter retract said work engaging member prior to the rough grinding operation, and means to again advance said work engaging member to engage the workpiece during a finish grinding operation.

21. In a grinding machine for grinding workpieces, a base, a work support mounted on said base, means for rotatably supporting a workpiece on said work support, a grinding wheel support on said base, means for rotatably supporting a grinding wheel on said wheel support, a steady rest for supporting a workpiece during a grinding operation comprising a support member movable toward and from operative position, a work engaging shoe on said support member movable toward and from a workpiece, means to advance said support member with said steady rest shoe in position to engage a workpiece for a precise angular adjustment of said workpiece, means to thereafter retract said steady rest shoe, and means operable at a later stage in the grinding cycle to again advance said steady rest shoe to engage and support the workpiece during a grinding operation.

22. In a grinding machine for grinding workpieces, a base, a work support mounted on said base, means for rotatably supporting a workpiece on said work support, a grinding wheel support on said base, means for rotatably supporting a grinding wheel on said wheel support, a steady rest for supporting a workpiece during a grinding operation comprising a support member movable toward and from operative position, a work engaging shoe on said support member movable toward and from a workpiece, means to advance said support member to operative position, means to advance said steady rest shoe to engage a workpiece for a precise angular adjustment of said workpiece, means to thereafter retract said steady rest shoe, and means operable at a later stage in the grinding cycle to again advance said steady rest shoe to engage and support the workpiece during a grinding operation.

23. In a grinding machine for grinding workpieces, a base, a work support mounted on said base, means for rotatably supporting a workpiece on said work support, a grinding wheel support on said base, means for rotatably supporting a grinding wheel on said wheel support, a locating device for effecting a precision endwise adjustment of said workpiece relative to said grinding wheel, a steady rest for supporting a workpiece during a grinding operation comprising a support member movable toward and from operative position, a work engaging shoe on said support member movable toward and from a workpiece, means to advance said support member to engage a workpiece for a precise angular adjustment of said workpiece, and control means operable in response to the advance of said support member to actuate said endwise adjusting means, and means operable at a later stage in the grinding cycle to advance said steady rest shoe to engage and support the workpiece during a grinding operation.

24. In a machine for grinding longitudinally spaced crankpins of automotive crankshafts, a base, a work support slidably mounted on said base, means for rotatably supporting a workpiece on said work support, chucks on said work support for holding a crankshaft in successive angular positions with the axis of each crankpin in alignment with the axis of said chucks, a motor for rotating said chucks, means to cause relative rotation of said chucks and said crankshaft to effect a rotary index of said crankshaft to place another crankpin in axial alignment with said chucks, a grinding wheel support slidably mounted on said base, a grinding wheel rotatably mounted on said wheel support, means to effect relative transverse and longitudinal movements of said supports to successively position said crankpin for successive grinding operations including co-acting longitudinal locating members normally in operative engagement, a caliper operable when a crankpin is ground to size to disengage said co-acting members, and means also actuated by said caliper to cause said rotary indexing of said crankshaft and said longitudinal movement of said work support to place another crankpin in position to be ground.

25. A machine for grinding a plurality of crankpins on a crankshaft comprising a base, a work support slidably mounted on said base, a pair of pot chucks rotatably mounted in axial alignment on said work support, a work drive motor, a grinding wheel support, a grinding wheel rotatably mounted on said wheel support, means for effecting relative transverse and longitudinal movements of said supports, means for stopping said longitudinal movement in predetermined positions to locate each of said crankpins in operative relation with said grinding wheel, rotary index means to cause relative rotation between said crankshaft and said chucks to index said crankshaft about its axis to place the next crankpin in axial alignment with the axis of said chucks, a steady rest on said base, means to advance and retract said steady rest relative to a crankshaft, a caliper, and control means operable by said caliper when the desired work size is reached to retract said grinding wheel, and after a predetermined interval, to retract said steady rest.

26. A machine for grinding a plurality of crankpins on a crankshaft comprising a base, a work support slidably mounted on said base, a pair of pot chucks rotatably mounted in axial alignment on said work support, a work drive motor, a grinding wheel support, a grinding wheel rotatably mounted on said wheel support, means for effecting relative transverse and longitudinal movements of said supports, means for stopping said longitudinal movement in predetermined positions to locate each of said crankpins in operative relation with said grinding wheel including co-acting longitudinal locating members normally in operative engagement, rotary index means to cause relative rotation between said crankshaft and said chucks to index said crankshaft about its axis to place the next crankpin in axial alignment with the axis of said chucks, means movable into and out of operative relation with said crankshaft to perform one or more precision adjustments on said crankshaft, and control means operable in response to operation of said precision adjusting means to actuate said rotary index means.

27. A machine for grinding a plurality of crankpins on a crankshaft comprising a base, a work support slidably mounted on said base, a pair of pot chucks rotatably mounted in axial alignment on said work support, a work drive motor, a grinding wheel support, a grinding wheel rotatably mounted on said wheel support, means for effecting relative transverse and longitudinal movements of said supports, means for stopping said longitudinal movement in predetermined positions to locate each of said crankpins in operative relation with said grinding wheel including co-acting longitudinal locating members normally in operative engagement, rotary index means to cause relative rotation between said crankshaft and said chucks to index said crankshaft about its axis to place the next crankpin in axial alignment with the axis of said chucks, a steady rest movable into and out of operative relation with said crankshaft, and control means operable by retraction of said steady rest to actuate said rotary index means.

28. A machine for grinding a plurality of crankpins on a crankshaft comprising a base, a work support slidably mounted on said base, a pair of pot chucks rotatably mounted in axial alignment on said work support, a work drive motor, a grinding wheel support, a grinding wheel rotatably mounted on said wheel support, means for effecting relative transverse and longitudinal movements of said supports, means for stopping said longitudinal movement in predetermined positions to locate each of said crankpins in operative relation with said grinding wheel including co-acting longitudinal locating members normally in operative engagement, rotary index means to cause relative rotation between said crankshaft and said chucks to index said crankshaft about its axis to place the next crankpin in axial alignment with the axis of said chucks, and control means operable by disengagement of said co-acting means to actuate said rotary index means.

29. A machine for grinding a plurality of crankpins on a crankshaft comprising a base, a work support slidably mounted on said base, a pair of pot chucks rotatably mounted in axial alignment on said work support, a work drive motor, a grinding wheel support, a grinding wheel rotatably mounted on said wheel support, means for effecting relative transverse and longitudinal movements of said supports, means for stopping said longitudinal movement in predetermined positions to locate each of said crankpins in operative relation with said grinding wheel including co-acting longitudinal locating members normally in operative engagement, rotary index means to cause relative rotation between said crankshaft and said chucks to index said crankshaft about its axis to place the next crankpin in axial alignment with the axis of said chucks, and control means operable by retraction of said wheel support to actuate said rotary index means.

30. A machine for grinding a plurality of crankpins on a crankshaft comprising a base, a work support slidably mounted on said base, a pair of pot chucks rotatably mounted in axial alignment on said work support, a work drive motor, a grinding wheel support, a grinding wheel rotatably mounted on said wheel support, means for effecting relative transverse and longitudinal movements of said supports, means for stopping said longitudinal movement in predetermined positions to locate each of said crankpins in operative relation with said grinding wheel including co-acting longitudinal locating members normally in operative engagement, rotary index means to cause relative rotation between said crankshaft and said chucks to index said crankshaft about its axis to place the next crankpin in axial alignment with the axis of said chucks, a steady rest movable into and out of operative relation with said crankshaft, and control means operable by the retraction of said steady rest and said wheel support and the disengagement of said co-acting means, to actuate said rotary index means.

References Cited in the file of this patent

UNITED STATES PATENTS

| 2,651,895 | Rocks | Sept. 15, 1953 |
| 2,809,472 | Happel | Oct. 15, 1957 |
| 2,848,849 | Balsiger | Aug. 26, 1958 |
| 2,899,778 | Bricker et al. | Aug. 18, 1959 |